(12) United States Patent
Fu

(10) Patent No.: US 6,263,828 B1
(45) Date of Patent: Jul. 24, 2001

(54) JINGLE BELL

(76) Inventor: Fon-Hsiung Fu, No. 486, Changshui Rd., Sec. 4, Hsihu Town, Changhua County (TW)

( * ) Notice: Subject to any disclaimer, the term of this patent is extended or adjusted under 35 U.S.C. 154(b) by 0 days.

(21) Appl. No.: 09/416,764

(22) Filed: Oct. 12, 1999

(51) Int. Cl.⁷ .................................................. G01K 1/074
(52) U.S. Cl. .......................................... 116/148; 116/154
(58) Field of Search ..................................... 116/148, 152, 116/154, 155, 156, 157, 158, 159, 160, 161, 162, 163, 164, 165, 166, 167, 168, 172; 84/406, 407

(56) References Cited

U.S. PATENT DOCUMENTS

| | | | |
|---|---|---|---|
| 562,638 | * | 6/1896 | Mills ..................................... 116/159 |
| 1,188,252 | * | 6/1916 | Crossland ............................. 116/57 |
| 5,550,319 | * | 8/1996 | Segan et al. .......................... 84/103 |

FOREIGN PATENT DOCUMENTS

881458 * 6/1953 (DE) .................................... 116/159

311734 * 10/1933 (IT) ..................................... 116/159

* cited by examiner

Primary Examiner—Andrew H. Hirshfeld
Assistant Examiner—R. Alexander Smith
(74) Attorney, Agent, or Firm—Rosenberg, Klein & Lee

(57) ABSTRACT

A jingle bell, which includes a holder base having a vertical center shaft and two upright locating rods, a dial supported on the holder base for turning by hand, the dial having equiangularly spaced triangular blocks, a rotary support member turned about the vertical center shaft, a gear transmission mechanism coupled between the dial and the rotary support member, a metal shell fixed mounted on the rotary support member, an annular locating plate supported on the upright locating rods, a plurality of spring elements suspended from the locating plate and holding a respective weight, wherein when the dial is rotated with the hand, the transmission mechanism is driven to rotate the rotary support member and the metal shell, and the triangular blocks are moved with the dial over the weights at the spring elements, causing the weights to strike the metal shell in producing sound.

6 Claims, 5 Drawing Sheets

JINGLE BELL

BACKGROUND OF THE INVENTION

The present invention relates to a jingle bell, and more particularly to such a jingle bell, which comprises a dial that strikes weights against a metal shell to produce sound when rotated.

A variety of mechanical as well as electronic bells have been disclosed, and have appeared on the market. A regular mechanical bell comprises a metal shell, a beater suspended in the metal shell, and a handle for operation by hand to move the beater against the metal shell. The user must operate the handle repeatedly, so that the beater can be moved back and forth to strike the metal shell again and again.

SUMMARY OF THE INVENTION

It is one object of the present invention to provide a jingle bell, which rotates a metal shell when operated. It is another object of the present invention to provide a jingle bell, which produces sound continuously when operated. It is still another object of the present invention to provide a jingle bell, which is equipped with decorative means. According to one aspect of the present invention, the jingle bell comprises a holder base, the holder base comprising a vertical center shaft raised from a top side wall thereof at the center, two upright locating rods raised from the top side wall and equally spaced from the vertical center shaft at two opposite sides, and a vertical axle raised from the top side wall, a driven gear mounted on the vertical axle at the holder base, a driving gear mounted on the vertical axle at the holder base and fixedly connected to the driven gear, a dial supported on the holder base for turning by hand, the dial comprising an internal gear meshed with the driving gear, and plurality of equiangularly spaced triangular blocks, an annular locating plate fixedly supported on the upright locating rods at the holder base, the annular locating plate comprising a center through hole, a plurality of spring elements respectively suspended from the annular locating plate, a plurality of weights respectively suspended from the spring elements, a rotary support member inserted through the center through hole at the annular locating plate and turned about the vertical center shaft at the holder base, the rotary support member comprising a gear wheel provided at a bottom side thereof and meshed with the driven gear, and a metal shell fixedly fastened to the rotary support member, wherein when the dial is rotated with the hand, said metal shell is rotated with the rotary support member, and the triangular blocks are moved with the dial over the weights at the spring elements, causing the weights to strike the metal shell in producing sound. According to another aspect of the present invention, the metal shell is fixedly fastened to the rotary support member by a plug cap. According to another an alternate form of the present invention, a coupling fastened to the vertical center shaft at the holder base to secure the metal shell to the vertical center shaft, and to hold a windmill outside the metal shell. According to still another aspect of the present invention, the holder base is equipped with a mounting device for mounting. Furthermore, a clamp fastened to the vertical center shaft to stop the rotary support member from falling out of the vertical center shaft.

DETAILED DESCRIPTION OF THE PREFERRED EMBODIMENT

Figure 1:
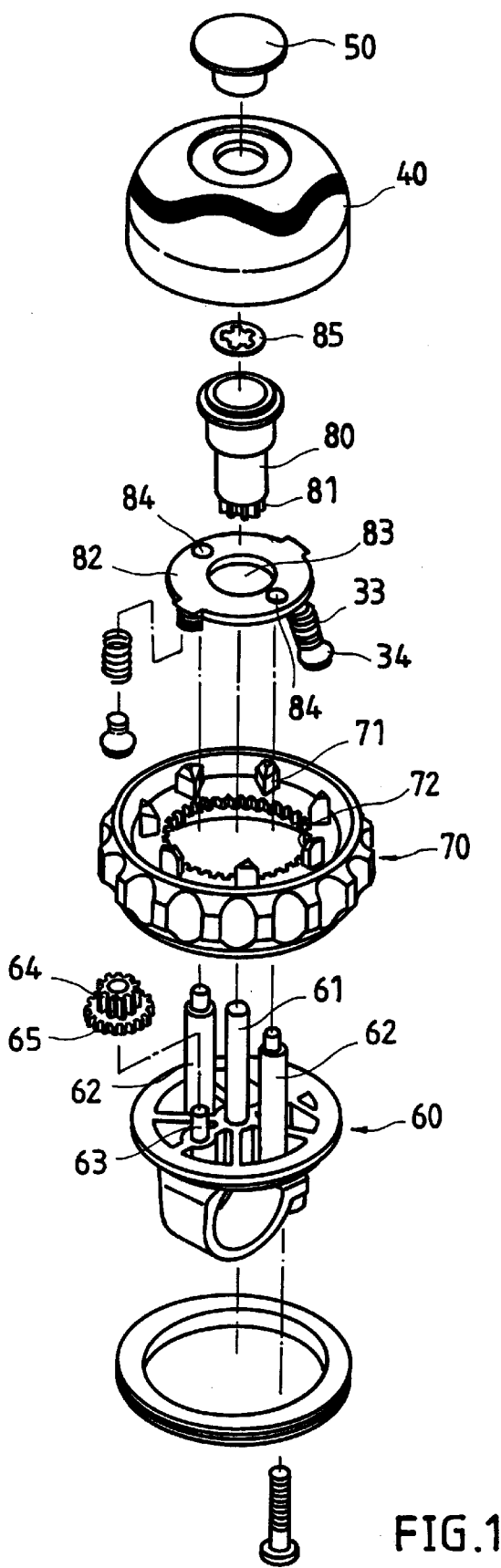
FIG. 1 is an exploded view of a jingle bell according to the present invention.

Referring to FIGS. from 1 through 3, a jingle bell is shown comprised of a holder base 60, a driving gear 64, a driven gear 65, a dial 70, a rotary support member 80, an annular locating plate 82, and a metal shell 40.

The holder base 60 comprises a vertical center shaft 61 raised from the top side wall thereof at the center, two upright locating rods 62 raised from the top side wall and equally spaced from the vertical center shaft 61 at two opposite sides, and a vertical axle 63 raised from the top side wall. The driving gear 64 and the driven gear 65 are mounted on the vertical axle 63. The driving gear 64 and the driven gear 65 are fixedly connected together. Alternatively, the driving gear 64 and the driven gear 65 can be formed integral with each other. The dial 70 is supported on the holder base 60, and turned about the center shaft 61, comprising an internal gear 72 meshed with the driving gear 64, and plurality of equiangularly spaced triangular blocks 71. The annular locating plate 82 is supported on the holder base 60 above the dial 70, comprising a center through hole 83, and two opposite mounting holes 84 respectively and fixedly fastened to the upright locating rods 62 at the holder base 60. A plurality of spring elements 33 are suspended from the bottom sidewall of the annular locating plate 82 to hold a respective weight 34. The rotary support member 80 is sleeved onto the vertical center shaft 61, having a gear wheel 81 provided at the bottom end thereof and meshed with the driven gear 65. The metal shell 40 is fastened to the rotary support member 80 at the top by a plug cap 50. Further, a clamp 85 is fastened to the vertical center shaft 61 to stop the rotary support member 80 from falling out of the vertical center shaft 61.

Figure 2:
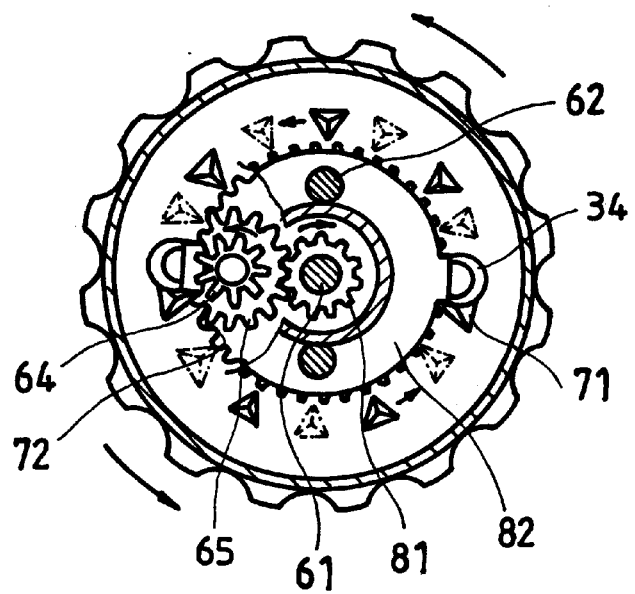
FIG. 2 is a top plain view of the jingle bell shown in FIG. 1, showing the dial rotated.
Figure 3:
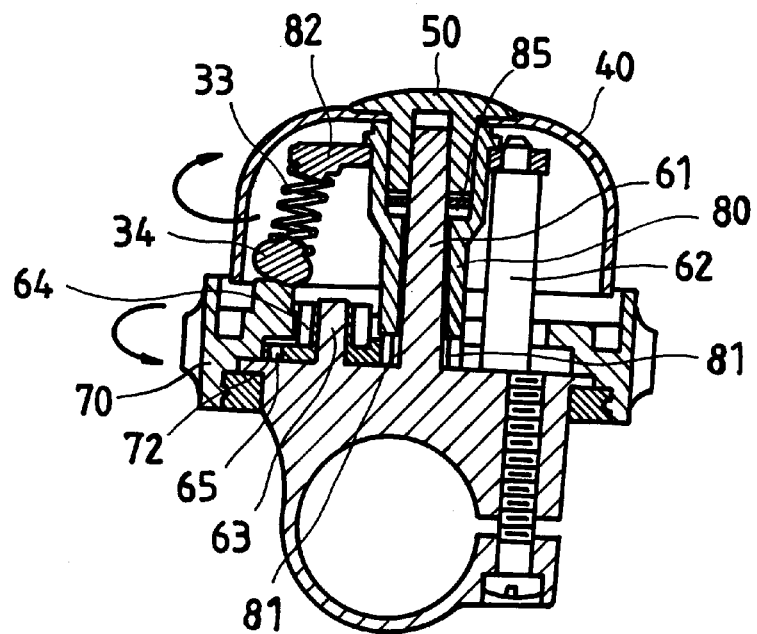
FIG. 3 is a side view in section of FIG. 2.

Referring to FIGS. 2 and 3 again, when the user rotates the dial 70, the triangular blocks 71 are moved with the dial 70 over the weights 34 at the spring elements 33, causing the weights 34 to strike the metal shell 40 in producing sound. During the rotary motion of the dial 70, the internal gear 72 is turned with the dial 70 to rotate the driving gear 64, thereby causing the driven gear 65 to rotate the gear wheel 81 and the rotary support member 80. Because the metal shell 40 is fixedly secured to the rotary support member 80, rotating the dial 70 causes the metal shell 40 to be rotated with the rotary support member 80. Because the rotary driving power is transmitted through the dial 70 to the metal shell 40 via a gear transmission mechanism (the internal gear 72, the driving gear 64, the driven gear 65, and the gear wheel 81), the metal shell 40 can be rotated at a high speed with less effort.

Figure 4:
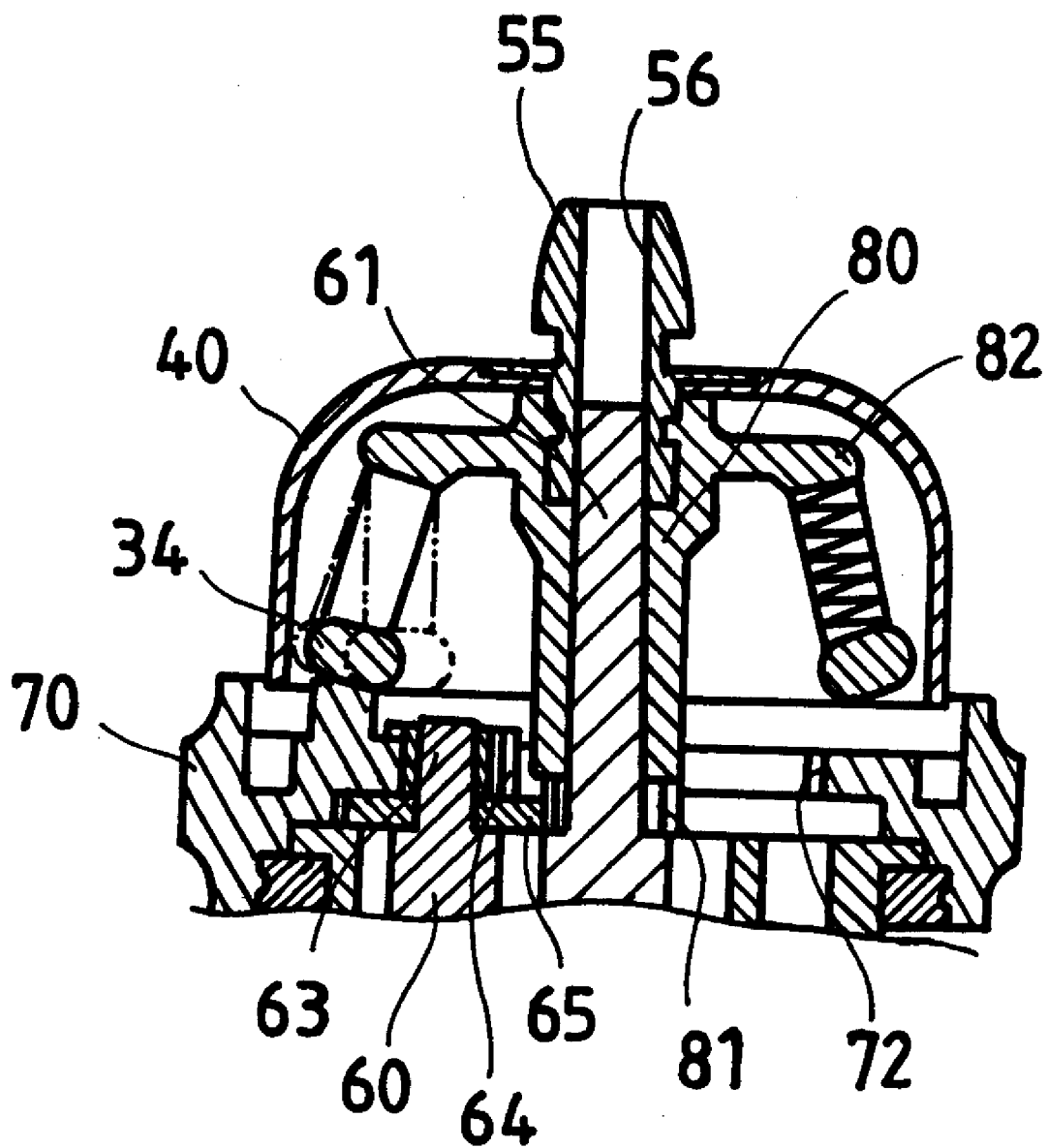
FIG. 4 is a side view in section of an alternate form of the jingle bell according to the present invention.
Figure 5:
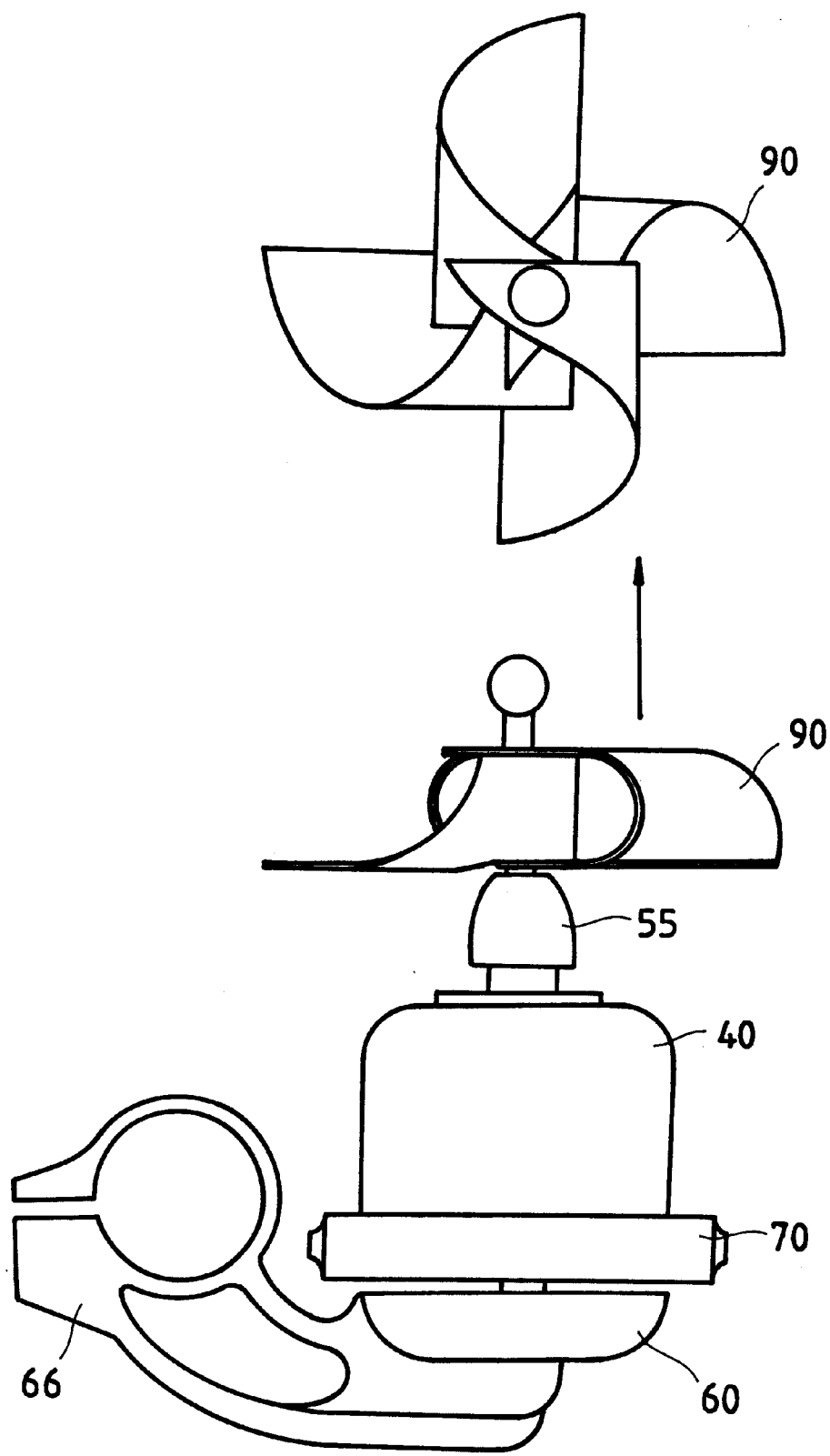
FIG. 5 shows a windmill coupled to the coupling at the center of the metal shell of the jingle bell according to the present invention.

FIGS. 4 and 5 show an alternate form of the present invention. According to this alternate form, a coupling 55 is fastened to the rotary support member 80 to secure the metal shell 40 in place, and a windmill 90 is coupled to a coupling hole 56 at the center of the coupling 55. When the windmill 90 is rotated with the coupling 55, the metal shell 40 and the rotary support member 80, the blades of the windmill 90 are turned about the longitudinal central axis of the windmill 90.

Figure 6:
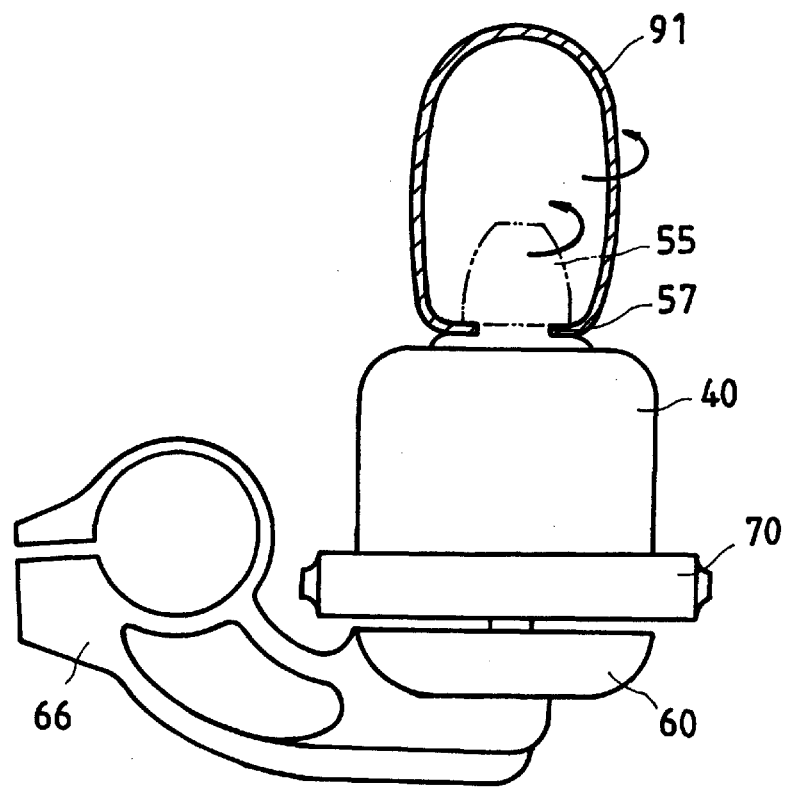
FIG. 6 shows an ornament coupled to the coupling at the center of the metal shell of the jingle bell according to the present invention.

FIG. 6 shows another alternate form of the present invention. According to this alternate form, the coupling 55 comprises a neck 57, and an ornament 91 is coupled to the neck 57 of the coupling 55. The ornament 91 can be a doll or artificial flower having a sound producing means installed therein.

Referring to FIGS. 5 and 6 again, the holder base 60 is equipped with a mounting device 66 for fastening to, for example, the handlebar of a bicycle.

Figure 7:
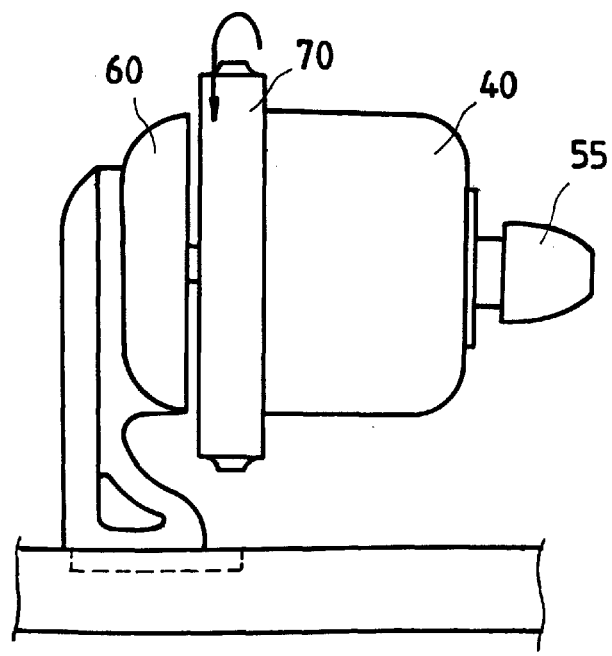
FIG. 7 illustrates another alternate form of the jingle bell for horizontal mounting according to the present invention.

Referring to FIG. 7, the holder base 60 of the jingle bell is designed for mounting on a flat wall to support the jingle bell in a horizontal position.

It is to be understood that the drawings are designed for purposes of illustration only, and are not intended as a definition of the limits and scope of the invention disclosed.

What the invention claimed is:

1. A jingle bell comprising:
    a holder base, said holder base comprising a vertical center shaft raised from a top side wall thereof at the center, two upright locating rods raised from the top side wall and equally spaced from said vertical center shaft at two opposite sides, and a vertical axle raised from the top side wall;
    a driven gear mounted on said vertical axle at said holder base;
    a driving gear mounted on said vertical axle at said holder base and fixedly connected to said driven gear;
    a dial supported on said holder base for turning by hand, said dial comprising an internal gear meshed with said driving gear, and a plurality of equiangularly spaced triangular blocks;
    an annular locating plate fixedly supported on the upright locating rods at said holder base, said annular locating plate comprising a center through hole;
    a plurality of spring elements respectively suspended from said annular locating plate;
    a plurality of weights respectively suspended from said spring elements;
    a rotary support member inserted through the center through hole at said annular locating plate and turned about said vertical center shaft at said holder base, said rotary support member comprising a gear wheel provided at a bottom side thereof and meshed with said driven gear; and
    a metal shell fixedly fastened to said rotary support member;
    wherein when said dial is rotated with the hand, said metal shell is rotated with said rotary support member, and said triangular blocks are moved with said dial over the weights at said spring elements, causing said weights to strike said metal shell for producing sound.

2. The jingle bell of claim 1 wherein said metal shell is fixedly fastened to said rotary support member by a plug cap.

3. The jingle bell of claim 1 further comprising a coupling fastened to said vertical center shaft at said holder base to secure said metal shell to said vertical center shaft, and a windmill mounted on said coupling.

4. The jingle bell of claim 1 further comprising a coupling fastened to said vertical center shaft at said holder base to secure said metal shell to said vertical center shaft, and an ornament mounted on said coupling.

5. The jingle bell of claim 1 wherein said holder base is equipped with a mounting device for mounting.

6. The jingle bell of claim 1 further comprising a clamp fastened to said vertical center shaft to stop said rotary support member from falling out of said vertical center shaft.

* * * * *